Oct. 19, 1943.  H. ERNST ET AL  2,331,967
CALCULATING DEVICE
Filed Sept. 8, 1941  2 Sheets-Sheet 1
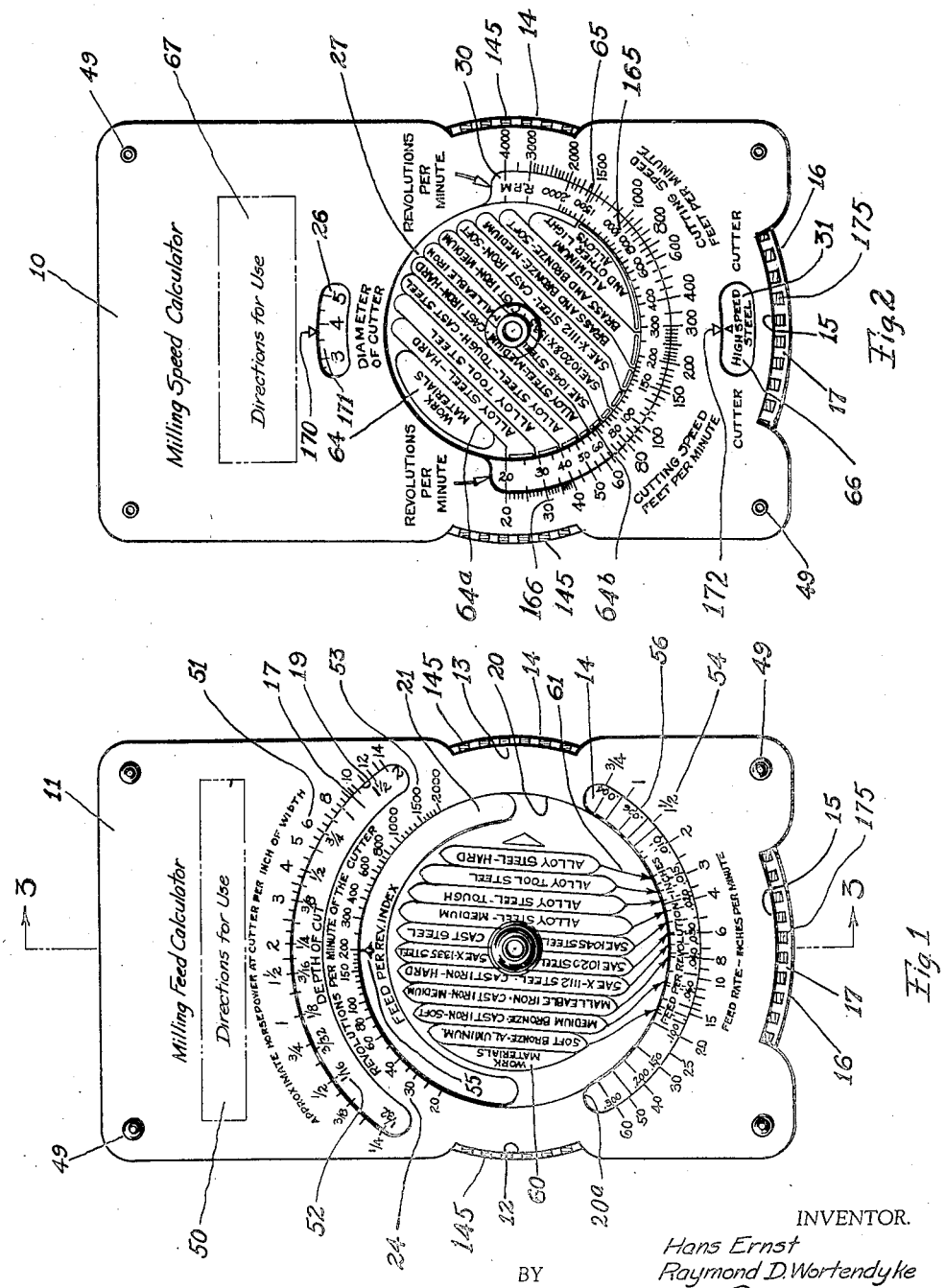
INVENTOR.
Hans Ernst
Raymond D. Wortendyke
BY
Parsons
ATTORNEY.

Oct. 19, 1943.  H. ERNST ET AL  2,331,967
CALCULATING DEVICE
Filed Sept. 8, 1941  2 Sheets-Sheet 2

INVENTOR.
Hans Ernst
Raymond D. Wortendyke
BY
ATTORNEY.

Patented Oct. 19, 1943

2,331,967

UNITED STATES PATENT OFFICE 2,331,967

CALCULATING DEVICE

Hans Ernst and Raymond D. Wortendyke, Cincinnati, Ohio, assignors to The Cincinnati Milling Machine Co., Cincinnati, Ohio, a corporation of Ohio Application September 8, 1941, Serial No. 409,978

8 Claims. (Cl. 235—84)

This invention relates to improvements in calculating devices and has particular reference to a novel and improved device for utilization in rate determination of the speeds and feeds to be selected for proper performance of milling, grinding or like machining operations.

One of the principal objects of the present invention is the provision of an improved device so constructed and arranged as to enable a machine operator, layout man or the like having knowledge of certain fixed factors, such as diameter of a rotating member and material of work and cutter, accurately to determine the proper rotative speed, feed rate and horsepower requirements for given depths of cut without the necessity of performing complicated mathematical calculations.

A further object of the present invention is the provision of a device of this character which will be of simple and compact form embodying a minimum number of relatively adjustable parts, each capable of performing multiple functions in determination of the essential speed and feed selections.

A further object of the present invention is the provision of a device basically constructed from transparent materials which shall present smooth, unbroken exterior surfaces and in which the arrangement of interior opaque and transparent portions shall be such as to blank out to a maximum degree the transmitted visibility of various indicia not utilized in determination of any particular factor or combination of factors.

A further object of the present invention is the provision of a device of the character indicated with suitable indicia, such as corresponding colorings common to jointly movable indicia bearing portions and the actuators therefor and distinct as respects separate actuators and their actuated parts whereby the part to be actuated for effecting a given reading or combination of readings is directly graphically indicated.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is a front view of a device constructed in accordance with and embodying the principles of the present invention.

Figure 2 is a similar view of the opposite face thereof.

MILLING FEED CALCULATOR

Figure 4:
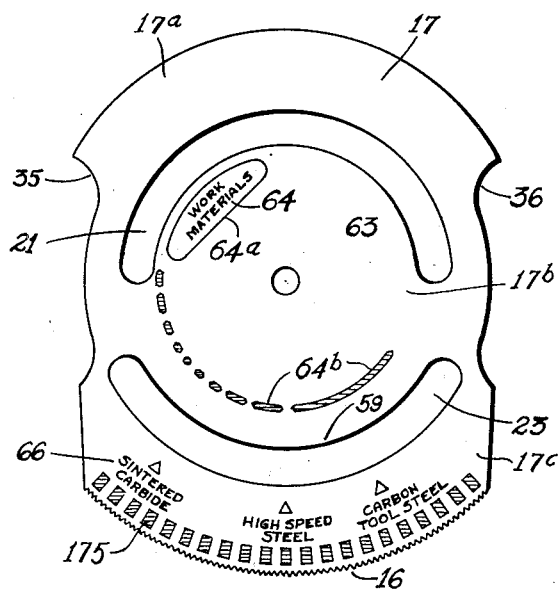
Figure 4 is a view of one of the movable elements removed with the indicia which is shown in detail in Figure 2 of the drawings diagrammatically indicated in part.

In the performance of machining operations for stock removal most efficient operation can usually be effected by causing a relative rotation between the work piece and cutter, together with a feeding movement causing relative traverse of the parts.

In a grinding machine, lathe, boring machine or the like, the rotative movement may be imparted to the work piece while the cutter is either stationary or preferably driven in opposition to the movement of the work piece, while in a milling machine the cutting action is produced by a rotating cutter, the work ordinarily being non-rotative. In either instance, suitable feeding mechanism is provided to cause relative movement—usually axially between the work and cutter so that the desired surface to be machined may be properly traversed.

In the form of invention chosen for purposes of illustration, there has been shown a calculator particularly adapted for utilization in connection with milling or like operations.

Best to preserve the device against soiling, smearing or the like, while facilitating its production in compact form such that it can be readily carried in the pocket or used on the drafting table or the like, the device is preferably constructed from a pair of outer plates or sheets 10 and 11 of Celluloid or similar flexible transparent material.

These plates are preferably similar in contour, being of generally rectangular form having arcuate notches formed as at 12 and 13 through which the edges of an interposed rotary member 14 extend for actuation purposes and having the additional arcuate notch 15 at one end through which projects the actuating portion 16 of the plate or member 17.

Underlying the member 11 is an opaque sheet 18 preferably suitably united with the plate 11 to form a unitary piece of material. The sheet 18 is provided with an arcuate slot or window 19 for affording visibility of the underlying member 17, and with a concentric circular window 20 affording visibility of the rotary member or disc 14 by way of an arcuate slot or window 21 in the intervening member 17. The lower edge of the window 20 is additionally cut away in the form of an arcuate slot portion 20a to permit visibility of indicia on member 14 by way of the arcuate slot or window 23 in member 17. The sheet 18 also provides an opaque strip 24 between windows 19 and 20 which bears indicia 53 for cooperation with certain indicia on disc 14, and also serves to blank out the indicia visible through slot 23 when disc 14 is rotated to position another set of indicia thereon beneath the window 23.

Figure 7:
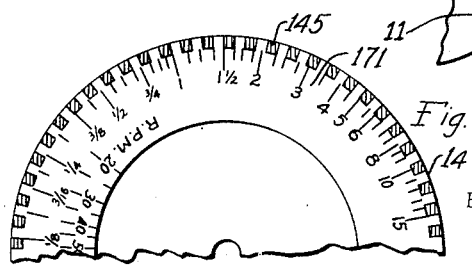
Figure 7 is a partial view of the opposite side of the circular member shown in Figure 6.

Considered from the reverse side as viewed in Figure 2, the transparent member 10 has the underlying opaque backing sheet 25 which is provided with a small arcuate slot or window 26 for affording visibility of a portion of the reverse side of member 14. An index 170 is arranged at the edge of the window 26 to coact with the diameter of cutter scale 171 which is on the disc 14, the scale being shown in full in Figure 7. The sheet 25 is also provided with a central circular window 27 through which the back of disc 17 is visible through the transparent portions 28 and 29 of member 14. In addition, the sheet 25 provides a third window opening 30 which is a continuation of the window 27 to provide visibility of indicia 165 on the reverse side of disc 14.

The lower portion of the sheet 25 has a small window opening disposed concentric with but of greater diameter than the disc 14 to provide visibility of indicia 66 on the back of member 17 which are adapted to register with a fixed index 172 on cover plate 10.

The member 17, it will be noted, is formed of a pair of transparent disc-like portions 32 and 33 with an intervening opaque sheet 34 in which the slot or window portions 21 and 23 are formed, the areas 17a, 17b and 17c being opaque and is notched at the edges as at 35 and 36 as shown in Figure 4 so that its side portions remain within the boundaries of the notches 12 and 13 of plates 10 and 11, permitting of projection of the disc 14 at the two sides of the calculator for ready access for actuation purposes in effecting rotation of the member 14.

Similarly, the member designated as an entirety by the reference character 14 comprises the transparent discs 37 and 38 with the intervening opaque unit 39 having the large circular window or aperture as at 40 underlying window 27. The several parts just described are centrally perforated to receive the hollow rivet 41 which provides a pivot about which the members 14 and 17 may be rotated, suitable spacers 42, 43 and 44 intervening the rotating elements and the outer plates so that these elements may freely rotate with respect to each other without being relatively frictionally actuated. Additionally, and in the interests of maintaining the members 14 and 17 in proper close relationship to the overlying plates or elements 10 and 11, and at the same time prevent interfrictional engagement, there is centrally interposed between the members 14 and 17 a transparent plate 45 having an enlarged central aperture as at 46 to avoid interference with the visibility through the windows of the other indicia bearing members.

Suitable spacers, such as 47 and 48, retain the side plates 10 and 11 in suitably spaced relationship so that the entire device may be secured together in a rigid unit at the corners as by the fastening devices 49.

Figure 3:
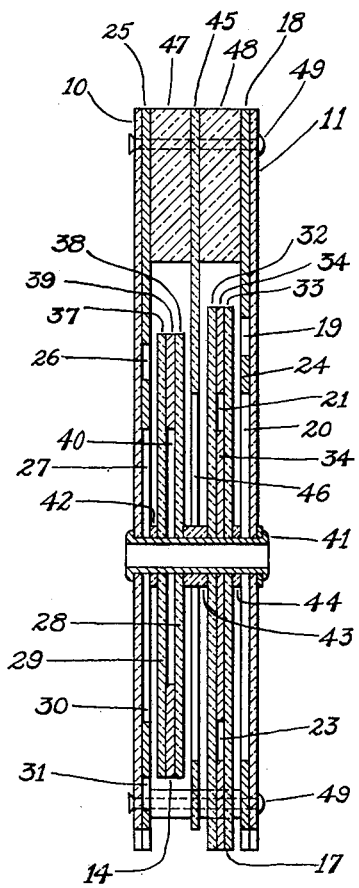
Figure 3 is a diagrammatic sectional view of the parts in exaggerated thickness to bring out their relative relationship taken as on the line 3—3 of Figure 1.

It will be particularly noted by reference to Figure 3 that while the structural features just described provide a multiplicity of circular and arcuate windows or transparent portions with the parts variably aligned or proportioned so that the shiftable central members may be seen in part through, by way of, or peripherally around each other, that the various opaque or blanking portions are so disposed that the device as an entirety presents a general opaque appearance with the windows disposed concentric but at different radial distances.

On account of this construction, the various indicia carried by the respective discs or elements and visible through the windows clearly stand out under all conditions of use and in practically all instances are so protected by duplex, overlying opaque portions on different elements that a series of clear readings may be obtained at either side of the device even though the same was being held toward the light and no interference is effected by blanked out indicia or indicia intended for use at the opposite side of the calculator.

For an understanding of the manner of utilization of the device in question, reference will first be made to Figure 1. This phase of the device, it will be noted, is particularly intended to enable a layout or time study man or an operator to determine the various essential facts regarding feed rate to be employed in performance of a particular machining operation.

At the uper portion is provided a block as at 50 containing directions for utilization of the device which for simplification of the drawings has been marked with indicia reading, "Directions for use," which detail directions may, for example, read substantially as follows:

"*Milling feed calculator*

To find:

Feed/tooth—
1. Set number of teeth in cutter to desired R. P. M. by rotating red disc.
2. Opposite any feed rate read the corresponding feed per tooth.

Horsepower—
1. Set work material to proposed feed rate by rotating blue sector.
2. Opposite depth of cut read the horsepower per inch of width.

Feed/rev.—
1. Set feed per rev. index to the desired R. P. M. by rotating red disc.
2. Opposite proposed feed rate read corresponding feed per rev."

Intermediate these directions and the window 19 in the member 11 are means in the form of indicia 51 logarithmically arranged indictative of requisite horsepower at cutter per inch of width of cut being taken.

Formed on the member 17 at the upper arcuate portion thereof in underlying relation with window 19 are means in the form of logarithmically arranged indicia 52 indicative of potential depths of cut so proportioned and arranged as to properly register with and cooperate with the indicia 51 to show the variants in horsepower required for different depths of cut. Immediately below window 19 is the arcuate strip 24, in turn provided with indicating means 53 in the form of a logarithmic scale indicative of potential revolutions per minute of the cutter as determinable, for example, through utilization of the reverse side of the device as particularly illustrated in Figure 2.

Figure 6:
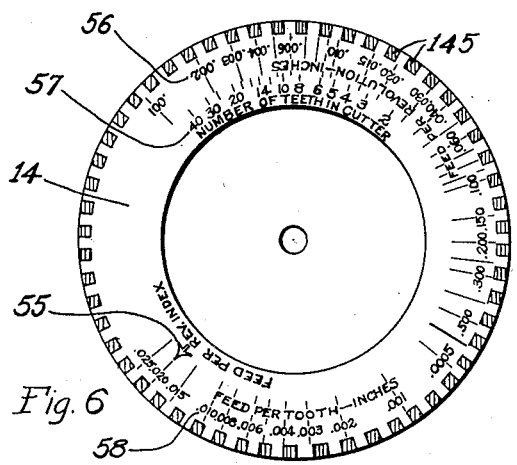
Figure 6 is a view of the circular adjustable member viewed as in Figure 1 but rotated 180 degrees.

It will be noted that the member 11 is provided with a large window 20, while the underlying member 17 has an arcuate window 21 through which an arcuate zone or portion of member 14 may be viewed. Member 14, as particularly brought out in connection with Figures 1 and 6, is provided with a plurality of indicia selectively coupled with the revolution indicating indicia 53 and feed rate indicating indicia 54 of member 11.

In one effective position of operation of the member 14, pointer 55, designated as "Feed per revolution index" may be selectively aligned with the desired revolutions per minute of the cutter as indicated by indicia 53 and when so aligned will cause suitable positioning of the series of indicia 56, on the diametrically opposite portion of the disc which show feed per revolution in inches (or thousandths of an inch) with the feed rate scale 54.

Alternatively, if the disc 14 be rotated 180 degrees the graduations 57 designated as number of teeth in cutter will be brought beneath window 21 and the graduations 58 indicative of feed per tooth in inches will be brought into registry with the scale 54 of feed rate in inches.

The wider portion as at 59 of member 17 serves alternatively to blank off the feed revolution pointer or the teeth in cutter indications, while the arcuate portion 24 of member 11 similarly blanks out either the feed per tooth or the feed per revolution indicia.

Figure 5:
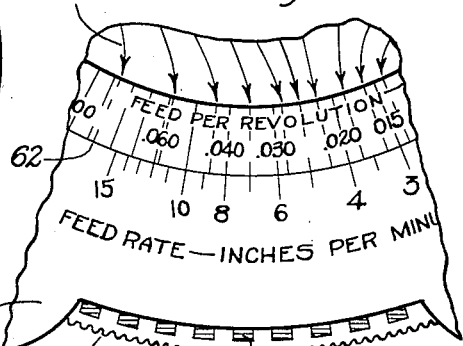
Figure 5 is an enlarged fragmentary view of essential structural features of the lower portion of the structure as viewed in Figure 1.

As a result, but one set is available for joint utilization at any time but by suitable rotation of the member 14 the cooperating pairs may be alternatively disposed in operative position. The central portion of member 17, it is to be noted, is provided with a plurality of indicia 60 indicative of various work materials to be machined and bears a plurality of logarithmically spaced pointers or indicators 61 formed on the opaque element 34 thereof and aligned in dash or other indicating lines 62 as shown in Figure 5 in a substantially radial direction across window 23 for registry with the feed rate scale, the work material to be operated upon having thus had its designator 61—2 brought into alignment with a selected aligned rate by oscillation of the member 17. The horsepower at cutter required per inch of width of cut in the particular material for a selected depth of cut may then be read from the cooperating indicia 51 and 52.

MILLING SPEED INDICATOR

Considering the opposite or reverse side of the device as particularly illustrated in its entirety in Figure 2, it will be noted that the member 10 is as an entirety opaque but has the small arcuate transparent or window portion as at 26 and the large central window 27 corresponding substantially in form and dimension to the opaque central portion 63 of member 17 through the central portion of which is visible the reverse side of member 17 bearing the work material designations 64, separated by indicating lines 64a, intervening terminal designation blocks 64b circumferentially therebeyond through the lower portion of the window is visible the portion 65 of member 14 bearing an arcuately arranged series of indicia 165 indicated as representing revolutions per minute of a rotary member such as a cutter or work piece and cooperating with the cutting speed, feet per minute indicia 166 on member 10.

Additionally, the member 10 has a lower window 31 disposed beyond the periphery of member 14 through which the reverse side of member 17 is visible, having disposed thereon at suitably spaced positions indicia such as 66 reading in terms of various materials of cutter which can be employed in the machining operation.

The member 10 is likewise provided with a suitable series of indicia as at 67 containing directions for use of this side of the device which may, for example, read substantially as follows:

"*Milling speed calculator*

To find: Revolutions per minute and cutting speed

1. Set diameter of cutter in the upper window by rotating red disc.
2. Set kind of cutter in the lower window by rotating blue sector.
3. Follow to left from selected work material to read the recommended R. P. M. on red scale and corresponding cutting speed on black scale"

It will be noted that in all instances the several scales on the various relatively adjustable members and their positioning determining means, such as registering pointers, graduations or the like, are so angularly positioned and logarithmically proportioned that for any given adjustment a complete series of readings of the relative variables can be effected.

It will further be noted that to facilitate determination of the member to be adjusted for effecting a desired result that the reading member, pointers, designation blocks and peripheral actuating portions of the members 14 and 17 are correspondingly colored as, for example, the several elements referred to of member 14 being marked in red and those of 17 in blue as indicated to the extent possible by conventional symbols, particularly in connection with enlarged views 4, 5 and 6 of the drawings.

For instance, the periphery of the member 14 is provided with a series of small blocks 145 which are colored red and to distinguish this color are vertically hatched, while the periphery of the member 17 is provided with a series of small blocks 175 which are colored blue and to distinguish this color these squares are horizontally hatched. Thus, the projecting edges of these members as shown in Figures 1 and 2 will display the respective colors of these members and indicate to the user the proper one to rotate, in accordance with the directions for use.

On account of this correspondence of designation by color or otherwise between the peripheral actuating portions of the respective discs or oscillatable members and the designations thereon visible through the respective windows or transparent portions of the outer plates with separate end and side locations of said actuating portions, the user of the device can instantly determine which actuator to utilize for effecting any desired relative positioning of the several parts of the device.

What is claimed is:

1. A device of the character described comprising a body element having a central transparent portion and a plurality of arcuate transparent portions, a member pivotally secured to the body element and disposed in underlying relation thereto, said pivoted member having opaque portions underlying certain of the transparent portions of the first element and transparent portions underlying certain of the arcuate transparent sections thereof, said body element having indicia disposed thereon in the form of a logarithmic scale reading in horsepower at cutter, disposed adjacent at one of the arcuate transparent portions thereof, the pivoted element having an opaque portion underlying said transparent arcuate portion provided with logarithmically arranged indicia indicative of depth of cut in position for cooperation with the horsepower indications on the main element, the main element having an additional series of logarithmically arranged feed rate designations adjacent another of the arcuate transparent portions thereof and the pivoted member having a series of blocks formed thereon for reception of indicia designating different work materials, said blocks terminating in pointers logarithmically spaced in accordance with the variants in machinability characteristics of the several work materials, whereby selective registration of the pointers and feed rate indicia will effect proper relative positioning of the depth of cut and horsepower indicia, a second member pivoted in underlying relation to the first having portions visible through the aligned transparent arcuate areas visible through the aligned transparent portions of the base element and first pivoted member, a revolution scale carried by the base element adjacent one of said aligned transparent portions, a feed per revolution pointer and a logarithmic cutter tooth scale carried by the second pivoted member and selectively positionable beneath the joint transparent apertures in proximity to the revolution scale on the base member, a feed per revolution scale formed on said second pivoted member disposed in opposition to the pointer for visibility through the aligned transparent portions of the base element and first pivoted member adjacent the feed rate scale and a feed per tooth scale additionally carried by the second pivoted member in opposition to the tooth scale thereon and positionable beneath the joint transparent portions of the base element and first pivoted member when said member is rotated to bring the tooth scale in cooperative relation with the revolution scale.

2. A device of the character described comprising a body element having a central transparent portion and a plurality of arcuate transparent portions, a member pivotally secured to the body element and disposed in underlying relation thereto, said pivoted member having opaque portions underlying certain of the transparent portions of the first element and transparent portions underlying certain of the arcuate transparent sections thereof, said body element having indicia disposed thereon in the form of a logarithmic scale reading in horsepower at cutter, disposed adjacent at one of the arcuate transparent portions thereof, the pivoted element having an opaque portion underlying said transparent arcuate portion provided with logarithmically arranged indicia indicative of depth of cut in position for cooperation with the horsepower indications on the main element, the main element having an additional series of logarithmically arranged feed rate designations adjacent another of the arcuate transparent portions thereof and the pivoted member having a series of blocks formed thereon for reception of indicia designating different work materials, said blocks terminating in pointers logarithmically spaced in accordance with the variants in machinability characteristics of the several work materials, whereby selective registration of the pointers and feed rate indicia will effect proper relative positioning of the depth of cut and horsepower indicia, a second member pivoted in underlying relation to the first having portions visible through the aligned transparent arcuate areas visible through the aligned transparent portions of the base element and first pivoted member, a revolution scale carried by the base element adjacent one of said aligned transparent portions, a feed per revolution pointer and a logarithmic cutter tooth scale carried by the second pivoted member and selectively positionable beneath the joint transparent apertures in proximity to the revolution scale on the base member, a feed per revolution scale formed on said second pivoted member disposed in opposition to the pointer for visibility through the aligned transparent portions of the base element and first pivoted member adjacent the feed rate scale and a feed per tooth scale additionally carried by the second pivoted member in opposition to the tooth scale thereon and positionable beneath the joint transparent portions of the base element and first pivoted member when said member is rotated to bring the tooth scale in cooperative relation with the revolution scale, each of said rotatable members having operating portions projecting laterally of the base element, and corresponding visible designations carried by the operating portions and indicating portions of the respective pivoted members for visual determination of the actuating portion to be operated for effecting adjustment of a desired series of shiftable indicia with respect to the several scale portions of the base element.

3. A device of the character described comprising a body element having a central transparent portion and a plurality of arcuate transparent portions, a member pivotally secured to the body element and disposed in underlying relation thereto, said pivoted member having opaque portions underlying certain of the transparent portions of the first element and transparent portions underlying certain of the arcuate transparent sections thereof, said body element having indicia disposed thereon in the form of a logarithmic scale reading in horsepower at cutter, disposed adjacent at one of the arcuate transparent portions thereof, the pivoted element having an opaque portion underlying said transparent arcuate portion provided with logarithmically arranged indicia indicative of depth of cut in position for cooperation with the horsepower indications on the main element, the main element having an additional series of logarithmically arranged feed rate designations adjacent another of the arcuate transparent portions thereof and the pivoted member having a series of blocks formed thereon for reception of indicia designating different work materials, said blocks terminating in pointers logarithmically spaced in accordance with the variants in machinability characteristics of the several work materials, whereby selective registration of the pointers and feed rate indicia will effect proper relative positioning of the depth of cut and horsepower indicia, a second member pivoted in underlying relation to the first having portions visible through the aligned transparent arcuate areas visible through the aligned transparent portions of the base element and first pivoted member, a revolution scale carried by the base element adjacent one of said aligned transparent portions, a feed per revolution pointer and a logarithmic cutter tooth scale carried by the second pivoted member and selectively positionable beneath the joint transparent apertures in proximity to the revolution scale on the base member, a feed per revolution scale formed on said second pivoted member disposed in opposition to the pointer for visibility through the aligned transparent portions of the base element and first pivoted member adjacent the feed rate scale and a feed per tooth scale additionally carried by the second pivoted member in opposition to the tooth scale thereon and positionable beneath the joint transparent portions of the base element and first pivoted member when said member is rotated to bring the tooth scale in cooperative relation with the revolution scale, the alternatively available indicia of the second rotatable member being disposed in overlying concentric groupings and the overlying base element and first pivoted element having oppositely disposed arcuate opaque portions for blanking out one or the other of the groupings of indicia on the second rotatable member in any position of rotation of the latter whereby selected pairings only of said indicia will be brought into registry with the respective transparent portions of the overlying members in any position of rotation of the second rotatable member.

4. A device of the character described, including a pair of opaque body elements each having a plurality of transparent portions formed therein including a central circular transparent portion and a plurality of concentrically disposed arcuate transparent portions, the arcuate portions of the respective members being disposed at different radial distances from the axis of the central circular transparent portions, and an adjustable member pivoted between the body elements concentric with the transparent windows thereof, said member having an opaque central portion blanking the circular transparent portions of both of said body elements and bearing on opposite sides of said opaque central portion a series of blocks containing indicia designating various work materials, said blocks terminating in indicators proportionally spaced in accordance with the machinability characteristics of the several materials designated within the blocks, and means providing rate designating indicia formed on the opaque portions of the body elements for cooperation with said indicators in various rotative adjusted positions of the intermediate member about its pivot, said intermediate member having additional indicia bearing portions visible through arcuate outer transparent portions of the respective body elements and indicating means on the body elements adjacent said windows for cooperation with the indicia on the pivoted member as visible through said arcuate transparent portions, substantially as and for the purpose described.

5. A device of the character described, including a pair of opaque body elements each having a plurality of transparent portions formed therein including a central circular transparent portion and a plurality of concentrically disposed arcuate transparent portions, the arcuate portions of the respective members being disposed at different radial distances from the axis of the central circular transparent portions, and an adjustable member pivoted between the body elements concentric with the transparent windows thereof, said member having an opaque central portion blanking the circular transparent portions of both of said body elements and bearing on opposite sides of said opaque central portion a series of blocks containing indicia designating various work materials, said blocks terminating in indicators proportionally spaced in accordance with the machinability characteristics of the several materials designated within the blocks, means providing rate designating indicia formed on the opaque portions of the body elements for cooperation with said indicators in various rotative adjusted positions of the intermediate member about its pivot, said intermediate member having additional indicia bearing portions visible through arcuate outer transparent portions of the respective body elements and indicating means on the body elements adjacent said windows for cooperation with the indicia on the pivoted member as visible through said arcuate transparent portions, a second rotatable member pivoted concentric with the first intermediate the body elements, said second member having a central transparent portion permitting visibility therethrough of the work material designations of the first pivoted member when the device is viewed from one side and having a plurality of arcuately arranged indicia on the opposite side including certain indicia disposed for cooperative positioning with respect to the work material designations on the opposite side, the first pivoted member having a plurality of transparent portions overlying the indicia of the second pivoted member to permit of visibility of the member therethrough, substantially as and for the purpose described.

6. A device of the character described, comprising a pair of rectangular cover members having aligned lateral recesses formed therein and additional terminal aligned recesses, a pivot member carried by and connecting said cover members, a first circular disc rotatably mounted on said pivoted member and having peripheral portions projecting into the lateral recesses of the cover members for effecting rotary actuation of the disc, an elongated second member mounted on said pivot and having a terminal projecting portion extending into the other of said recesses whereby said member may be oscillated about the pivot by actuation of said projecting portion, both of said cover members having transparent central portions surrounding the pivot and the disc having a coinciding transparent central portion whereby the central portion of the elongated member is rendered visible from either side of the device, work material designation blocks formed on both sides of the central portion of said elongated member, said cover members having auxiliary windows formed therein, position determinators formed on opposite sides of the elongated member in underlying relation to the windows for determination of positional adjustments of said elongated member about its pivot with respect to the cover members, and scales formed on the cover members arranged concentrically with the arcuate path of movement of the work material designating blocks for cooperation therewith upon oscillation of the elongated member to selected adjustments as determined by the position determinators, substantially as and for the purpose described.

7. A device of the character described, comprising a pair of rectangular cover members having aligned lateral recesses formed therein and additional terminal aligned recesses, a pivot member carried by and connecting said cover members, a first circular disc rotatably mounted on said pivoted member and having peripheral portions projecting into the lateral recesses of the cover members for effecting rotary actuation of the disc, an elongated second member mounted on said pivot and having a terminal projecting portion extending into the other of said recesses whereby said member may be oscillated about the pivot by actuation of said projecting portion, both of said cover members having transparent central portions surrounding the pivot and the disc having a coinciding transparent central portion whereby the central portion of the elongated member is rendered visible from either side of the device, work material designation blocks formed on both sides of the central portion of said elongated member, said cover members having auxiliary windows formed therein, position determinators formed on opposite sides of the elongated member in underlying relation to the windows for determination of positional adjustments of said elongated member about its pivot with respect to the cover members, scales formed on the cover members arranged concentrically with the arcuate path of movement of the work material designating blocks for cooperation therewith upon oscillation of the elongated member to select adjustments as determined by the position determinators, the cover member adjacent the rotary disc having auxiliary transparent portions or windows formed therein through which selected portions of the disc may be viewed and the elongated member having auxiliary transparent portions formed therein in cooperative relation with the transparent portion of the opposite cover member whereby the reverse side of the rotary disc may be viewed by way of the cover member and adjacent elongated member.

8. A device of the character described, comprising a pair of rectangular cover members having aligned lateral recesses formed therein and additional terminal aligned recesses, a pivot member carried by and connecting said cover members, a first circular disc rotatably mounted on said pivoted member and having peripheral portions projecting into the lateral recesses of the cover members for effecting rotary actuation of the disc, an elongated second member mounted on said pivot and having a terminal projecting portion extending into the other of said recesses whereby said member may be oscillated about the pivot by actuation of said projecting portion, both of said cover members having transparent central portions surrounding the pivot and the disc having a coinciding transparent central portion whereby the central portion of the elongated member is rendered visible from either side of the device, work material designation blocks formed on both sides of the central portion of said elongated member, said cover members having auxiliary windows formed therein, position determinators formed on opposite sides of the elongated member in underlying relation to the windows for determination of positional adjustments of said elongated member about its pivot with respect to the cover members, scales formed on the cover members arranged concentrically with the arcuate path of movement of the work material designating blocks for cooperation therewith upon oscillation of the elongated member to select adjustments as determined by the position determinators, the cover member adjacent the rotary disc having auxiliary transparent portions or windows formed therein through which selected portions of the disc may be viewed and the elongated member having auxiliary transparent portions formed therein in cooperative relation with the transparent portion of the opposite cover member whereby the reverse side of the rotary disc may be viewed by way of the cover member and adjacent elongated member, each cover member having formed thereon cooperating sets of position determinators and logarithmic scales in juxtaposition to the disc-viewing windows and the rotary disc having formed on opposite faces thereof opposed sets of logarithmically arranged scales for cooperation with the scales and position determinators on the cover members as the rotary disc is viewed through the respective windows, substantially as and for the purpose described.

HANS ERNST.
RAYMOND D. WORTENDYKE.